United States Patent [19]

Barber et al.

[11] Patent Number: 5,201,174

[45] Date of Patent: Apr. 13, 1993

[54] AUXILIARY HYDRAULIC PUMP SYSTEM

[75] Inventors: Dennis R. Barber, Chanhassen, Minn.; Gregory E. Sparks, Waterloo, Iowa

[73] Assignee: Deere & Company, Moline, Ill.

[21] Appl. No.: 801,299

[22] Filed: Dec. 2, 1991

[51] Int. Cl.[5] .......................................... F16D 31/02
[52] U.S. Cl. ....................................... 60/405; 60/430; 60/452; 60/486; 180/133; 417/214; 417/216
[58] Field of Search ............... 60/405, 428, 430, 445, 60/452, 486; 417/214, 216; 180/133

[56] References Cited

U.S. PATENT DOCUMENTS

| | | | |
|---|---|---|---|
| 2,064,750 | 12/1936 | Hurst | 417/214 |
| 3,006,148 | 10/1961 | Hause | 417/214 X |
| 3,280,557 | 10/1966 | Sattavara | 180/133 X |
| 3,800,900 | 4/1974 | Goodale | 60/405 X |
| 3,820,620 | 6/1974 | Miller et al. | |
| 3,962,870 | 6/1976 | Lech | 60/430 X |
| 3,968,650 | 7/1976 | Bacquié et al. | 60/428 |
| 3,995,711 | 12/1976 | Kittle et al. | |
| 4,015,681 | 4/1977 | Shore et al. | |
| 4,076,096 | 2/1978 | Hushower et al. | |
| 4,160,490 | 7/1979 | Bexten et al. | |
| 4,303,089 | 12/1981 | Gage et al. | |
| 4,317,499 | 3/1982 | Miller | |
| 4,326,558 | 4/1982 | Gage | |
| 4,345,660 | 8/1982 | Miller | |
| 4,515,530 | 5/1985 | Christoleit | 417/214 |

FOREIGN PATENT DOCUMENTS 65304 11/1982 European Pat. Off. ............. 60/452

*Primary Examiner*—Edward K. Look
*Assistant Examiner*—Todd Mattingly

[57] ABSTRACT

An engine-driven pump supplies pressurized hydraulic fluid to vehicle brake and steering circuits. A ground driven variable displacement pump controlled by a control circuit is de-stroked when the engine-driven pump is operational. The variable displacement pump includes a movable piston which divides a bore into a pilot chamber and a pump chamber. An outlet line with a check valve communicates fluid one way from the pump chamber to the vehicle circuits. An inlet line with a check valve communicates fluid one way from a reservoir to the pump chamber. A ground-driven rotatable cam member reciprocates the piston. A spring urges the piston towards the cam member and towards a full stroke position. A pilot line which communicates fluid pressure from an outlet of the engine-driven pump to the pilot chamber. When the engine-driven pump is operational the pressure in the pilot line moves the piston away from the cam member, thus de-stroking the variable displacement pump. When the engine-driven pump stops, the pilot pressure drops, causing the variable displacement pump to go into stroke. A relief valve may be used to reduce the stroke of the variable displacement pump when its output pressure is too high.

4 Claims, 5 Drawing Sheets

AUXILIARY HYDRAULIC PUMP SYSTEM

BACKGROUND OF THE INVENTION

Many vehicles have hydraulic brake and/or steering systems which are powered by an engine-driven hydraulic pump. Some such vehicles are so heavy that they cannot be manually steered or braked in accordance with legal requirements in the case of engine power failure. Therefore, an auxiliary source of fluid pressure has been required in these cases to provide hydraulic pressure to the steering and/or brake systems. This need for an auxiliary source of fluid pressure has been satisfied in the past by different means. For example, accumulator systems are described in U.S. Pat. No. 4,326,558, issued Apr. 27, 1982 to Gage and U.S. Pat. No. 4,303,089, issued Dec. 1, 1981 to Gage et al. Systems with electrically powered auxiliary pumps are described in U.S. Pat. No. 3,820,620, issued Jun. 28, 1974 to Miller et al. and in U.S. Pat. No. 3,995,711, issued Dec. 7, 1976 to Kittle et al. Systems with ground-driven auxiliary pumps are described in U.S. Pat. No. 4,160,490, issued Jul. 10, 1979 to Bexten et al., in U.S. Pat. No. 4,076,096, issued Feb. 28, 1978 to Hushower et al. and in U.S. Pat. No. 4,015,681, issued Apr. 5, 1977 to Shore et al. The typical ground-driven auxiliary pump system includes a fixed displacement ground-driven pump, a series of check valves to provide bi-directional operation, and an unloading valve to reduce heat generation when the engine-driven pump is operating. Historically, accumulator and electric powered systems have been preferred over ground-driven systems because considerations of cost, complexity and power loss problems associated with ground-driven systems have made them impractical, even though performance and reliability may be superior. It would be desirable to have a simple, low cost and efficient ground-driven auxiliary pump system.

SUMMARY OF THE INVENTION

An object of this invention to provide a low cost, simple and efficient system which provides an auxiliary source of pressurized hydraulic fluid for a vehicle hydraulic system.

Another object of this invention to provide such a system which includes a ground-driven auxiliary pump.

Another object of this invention is to assure that the variable displacement pump will be in full stroke when the engine-driven pump is not operating.

Another object of this invention is to prevent pressure loss from the pilot chamber to sump when pressure from the engine-driven pump is high.

These and other objects are achieved by the present invention which includes an engine driven main pump and an auxiliary ground-driven variable displacement pump which supply pressurized hydraulic fluid to vehicle brake and steering circuits. A control circuit de-strokes the variable displacement pump when the engine driven pump is operational. The variable displacement pump includes a piston movable in a bore in a housing. The piston divides the bore into a pilot chamber and a pump chamber. An auxiliary outlet line with a check valve communicates fluid one way from the pump chamber to the vehicle circuits. An auxiliary inlet line with a check valve communicates fluid one way from a reservoir to the pump chamber. A ground-driven rotatable cam member engages the piston to reciprocate the piston in response to rotation of the rotatable member. A spring urges the piston towards the rotatable member and towards a full stroke position. The control circuit includes a pilot line which communicates fluid pressure from an outlet of the engine-driven pump to the pilot chamber. In addition, a relief valve may be used to reduce the stroke of the variable displacement pump when the output pressure of the variable displacement pump is too high. A shuttle valve assures that the variable displacement pump will be in full stroke when the engine-driven pump is not operating, and prevents pressure loss from the pilot chamber to sump when pressure from the engine-driven pump is high.

DETAILED DESCRIPTION

Figure 1:
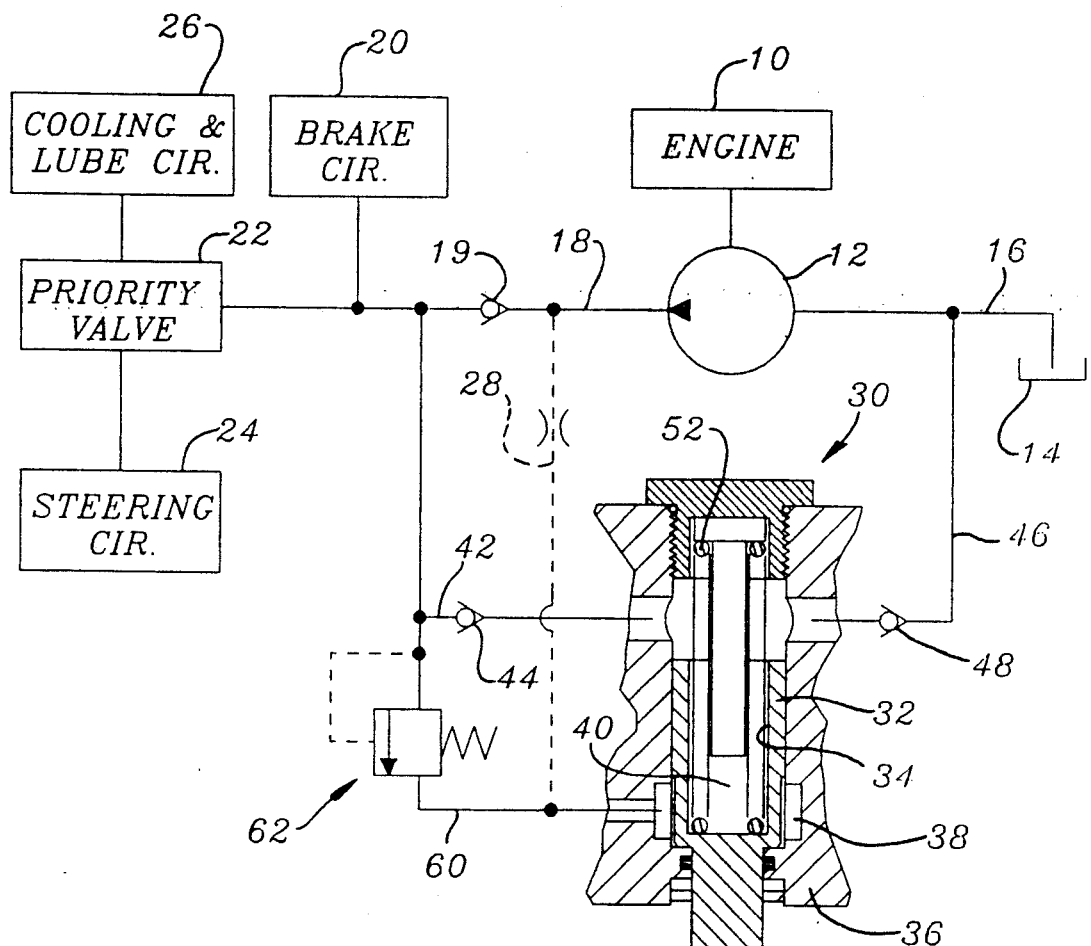
FIG. 1 is a partially cross sectional and partially schematic view of one embodiment of the present invention.
Figure 2:
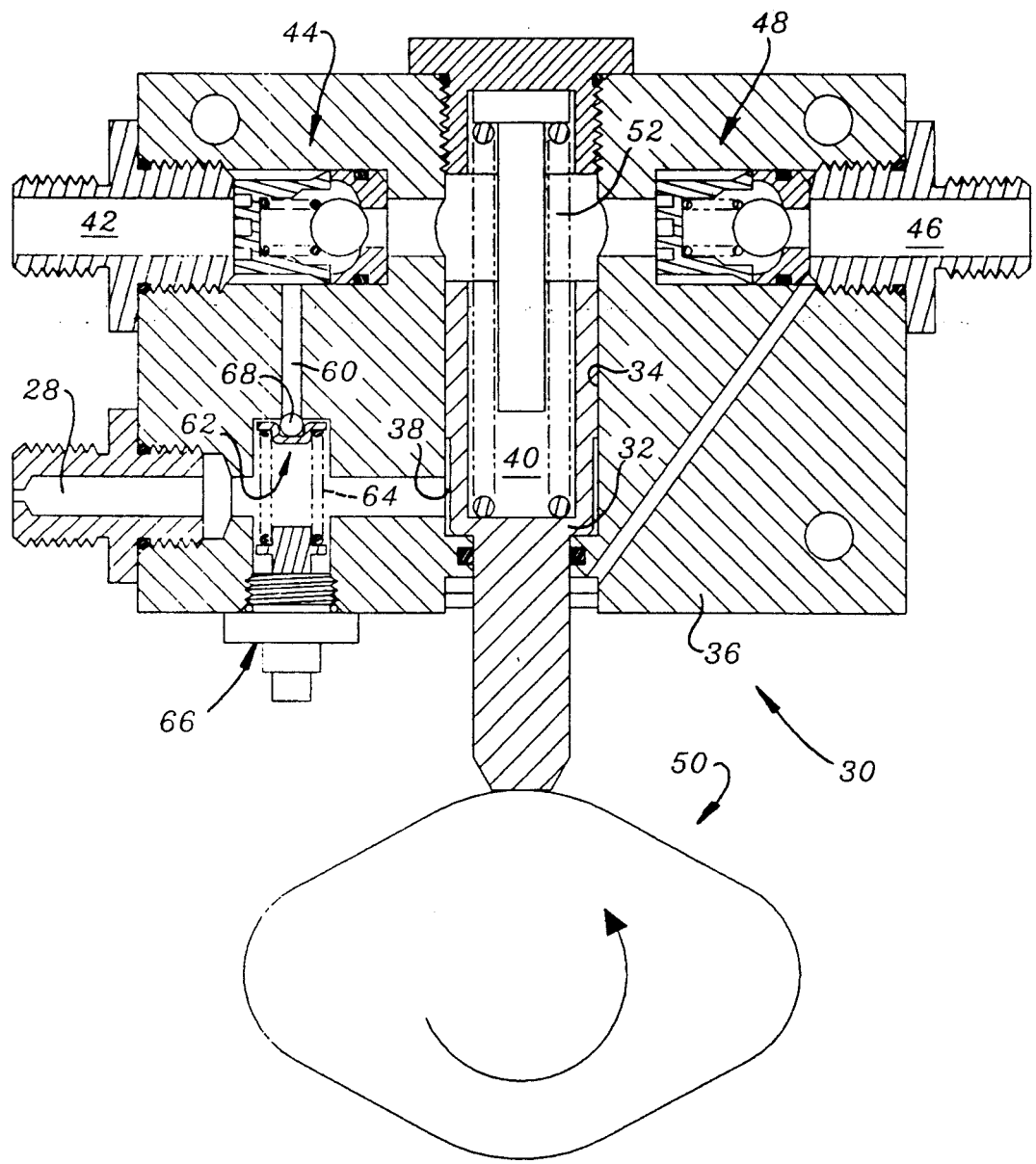
FIG. 2 is a cross sectional view of the first embodiment of the present invention.

Referring to FIGS. 1 and 2, a vehicle (not shown) includes an engine 10 which, when operating, drives a hydraulic pump 12 which draws hydraulic fluid from reservoir 14 through conduit 16 and supplies hydraulic fluid under pressure through line or conduit 18 and check valve 19 to a the vehicle hydraulic brake circuit 20 and, via a priority valve 22, to the vehicle hydraulic steering circuit 24 and the cooling and lube circuits 26. The check valve 19 permits flow of hydraulic fluid from the engine-driven pump 12 to the brake circuit 20 and the valve 22, while preventing such flow in the opposite direction if the pressure on the engine-driven pump side drops below a predetermined value. The priority valve 22 and the circuits 20, 24 and 26 are conventional and wellknown.

An auxiliary source of pressurized hydraulic fluid includes a ground driven variable displacement pump 30 and a control circuit for de-stroking the variable displacement pump 30 when the engine driven pump 12 is operational. The variable displacement pump 30 includes a piston 32 movable in a bore 34 in a housing 36. The piston 32 divides the bore 34 into a pilot chamber 38 and a pump chamber 40. An auxiliary outlet line 42 with a check valve 44 communicates fluid one way from the pump chamber 40 to the main outlet line 18. An auxiliary inlet line 46 with a check valve 48 communicates fluid one way from the main inlet line 16 to the pump chamber 40. A pilot line 28 communicates fluid pressure from the main outlet line 18 to the pilot chamber 38.

A reversible ground-driven rotatable cam member 50 engages the piston 32 to reciprocate the piston in response to rotation of the rotatable member 50. A spring 52 is mounted in the pump chamber 40 and urges the piston 32 to a full stroke position. When the pump 12 is operational the pressure in the pilot line 28 moves the piston 32 away from the cam member 50, thus de-stroking the variable displacement pump 30. When the engine driven pump 12 stops operating or when the engine 10 stops, the pressure in pilot line 28 drops, allowing the piston to move towards the cam member 50, causing the variable displacement pump 30 to go into stroke. Preferably, in addition, a relief conduit 60 communicates outlet line 42 with pilot line 28. A relief valve 62 may be inserted in the relief conduit 60 to reduce the stroke of the variable displacement pump 30 when the output pressure of the variable displacement pump 30 has reached the pressure which is necessary for the brake and steering functions. Normally, a spring 64 and tension adjusting device 66 biases a ball 68 of the relief valve 62 to a position is closing communication from outlet 42 to pilot chamber 38.

When hydraulic pressure is present in conduit 18, as will normally be the case when the engine 10 is operating, the spring 52 will be compressed and the piston 32 will be shifted to the left, viewing FIG. 1. When so shifted, the piston 32 will not reciprocate, or its stroke will be reduced as the cam member 50 rotates.

If the engine 10 stops operating, then the main pump 12 will stop operating, and the hydraulic pressure in conduit 18 will be lost. The resulting drop in hydraulic pressure in conduit 18 will be transmitted to the chamber 38 via pilot line 28. When the pressure in chamber 38 drops to a certain level, such as below 150 psi for example, the force of spring 52 will shift the piston 32 to the right and into engagement with the ground driven cam member 50. In this position, the stroke and the volume of fluid displaced from the piston 32 is increased as the ground driven cam member 50 rotates.

Thus, if the vehicle is traveling in a forward or reverse direction, the brake and steering circuits 20,26 will receive hydraulic fluid pressure from the auxiliary pump 30 to operate the vehicle brake and steering systems as they normally would in receiving hydraulic fluid from the engine-driven pump 12.

Figure 3:
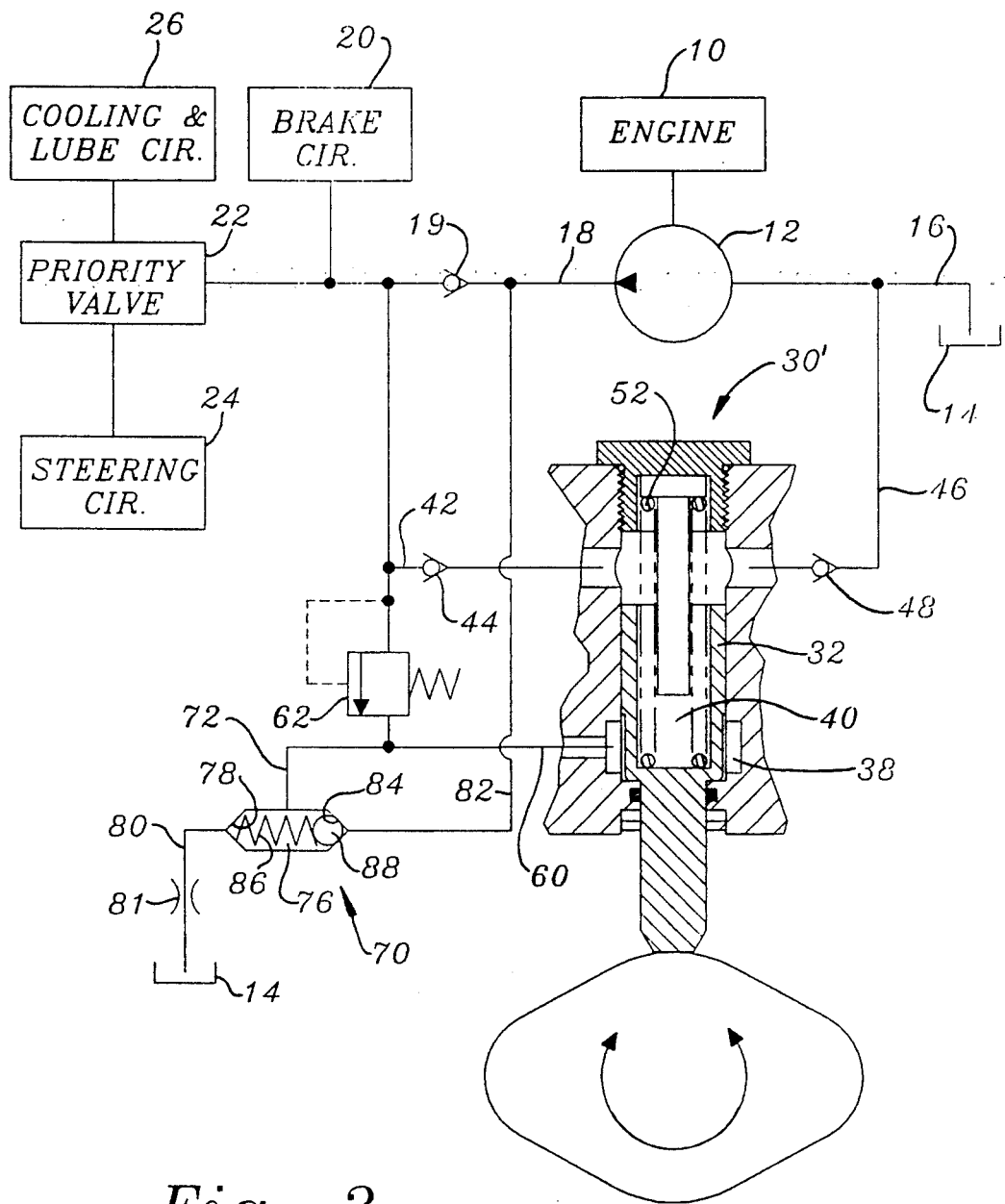
FIG. 3 is a cross sectional and partially schematic view of a second embodiment of the present invention.
Figure 4:
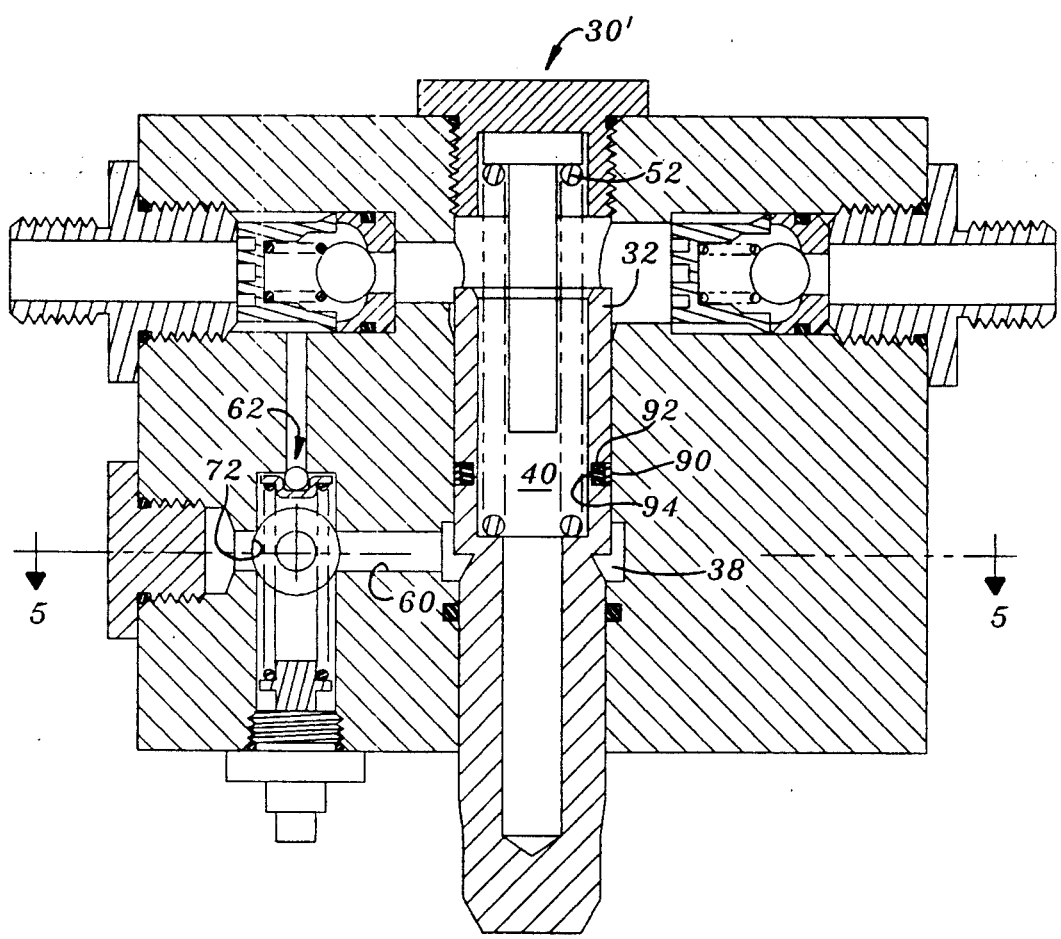
FIG. 4 is a cross sectional view of the second embodiment of the present invention.
Figure 5:
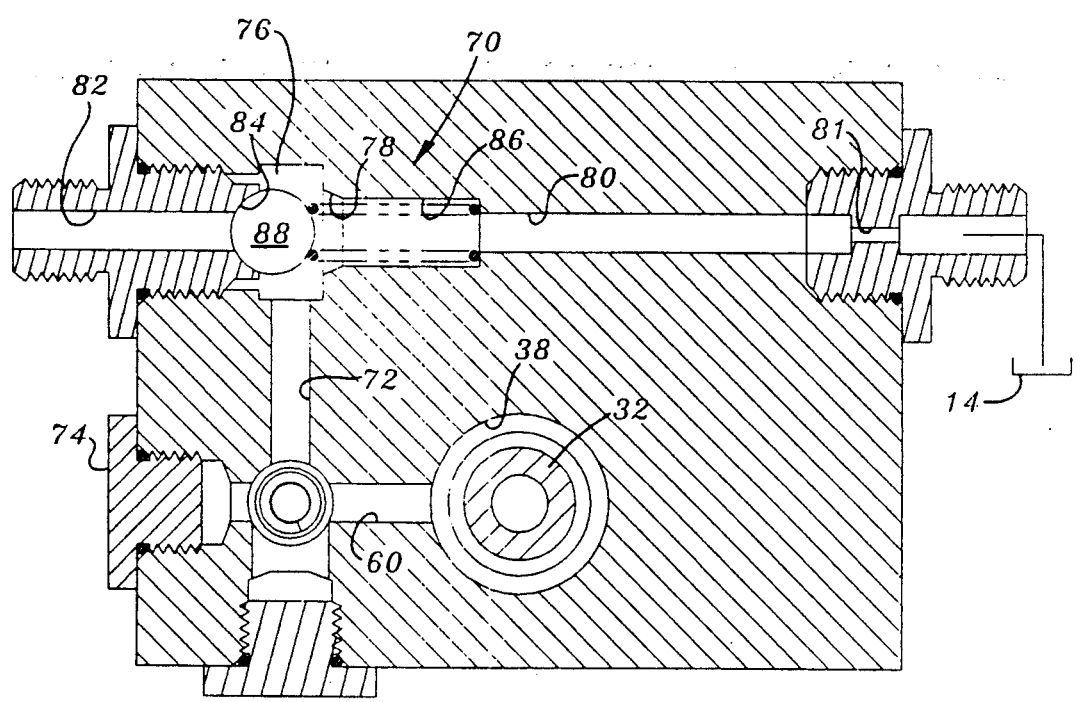
FIG. 5 is a cross sectional view along lines 5—5 of FIG. 4.

Referring now to FIGS. 3, 4 and 5, the alternate embodiment shown therein includes structure which is similar to the embodiment of FIGS. 1 and 2, and the same reference numerals are use to indicate similar parts. Referring now to FIG. 3, in this alternate embodiment a shuttle check valve 70 has a first or shuttle inlet port communicated with the outlet of the engine driven pump 12, a second or drain port communicated with the reservoir 14 and a third or shuttle pilot port which is communicated with pilot chamber 38 via passage 72, the bore of the relief valve 62 and passage 60.

Referring now to FIGS. 4 and 5, the passage extending to the left from relief valve 62 is blocked by a plug 74 and passage 72 communicates passage 60 with a chamber 76 of shuttle check valve 70. This chamber 76 is communicated with reservoir 14 via valve seat 78 and passage 80 and with the outlet of the engine driven pump 12 via valve seat 84 and passage 82. A spring 86 normally biases the ball 88 of shuttle check valve 70 into sealing engagement with valve seat 84. The ball 88 of shuttle check valve 70 moves into sealing engagement with valve seat 78 and the shuttle check valve 70 blocks drain passage 80 when the outlet pressure from the engine-driven pump 12 is high, as it is under normal conditions, thus eliminating power loss through passage 80 and orifice 81. When the pressure from the engine driven pump 12 is lost, then spring 86 will move the ball 88 away from seat 78 to open communication from chamber 38 to reservoir 14 via passages 60, 72 and 80, thus placing the piston 32 in a full stroke condition.

Also, as best seen in FIG. 4, a cap seal 90 (preferably made of a low friction material) and an O-ring seal 92 are installed in an annular seal groove 94 in the periphery of the piston 32. The cap seal 90 and the O-ring seal 92 eliminate drift and keep the piston 32 de-stroked when the engine driven pump 12 is operating and the pilot pressure in chamber 38 is high.

While the invention has been described in conjunction with specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle having a hydraulic function, an engine-driven pump for supplying pressurized hydraulic fluid to the hydraulic function, an ground-driven source of pressurized hydraulic fluid and control means for controlling operation of the ground-driven source, the improvement wherein:

the ground-driven source comprises a variable displacement pump, the variable displacement pump comprising a variable stroke cylinder comprising a housing having a bore therein, a piston movable in the bore and cooperating with a wall of the bore to divide the bore into a pilot chamber and a pump chamber, the piston being movable to a de-stroked position in response to fluid pressure in the pilot chamber, and resilient means biased to urge the piston to a stroked position, and a rotatable member having a cam member engageable with the piston to reciprocate the piston in response to rotation of the rotatable member;

the control means comprises means for de-stroking the variable displacement pump when the engine-driven pump is operational, the control means comprising a pilot line for communicating fluid pressure from an outlet of the engine-driven pump to the pilot chamber, an outlet line for communicating fluid from the pump chamber to the hydraulic function, and an inlet line for communicating fluid from a fluid reservoir to the pump chamber; and a shuttle valve having an inlet shuttle port communicated with the outlet of the engine-driven pump, a drain shuttle port communicated with a fluid reservoir and a pilot shuttle port communicated with the pilot chamber, a shuttle valve member movable to a first position opening communication between the inlet shuttle port and the pilot shuttle port and blocking communication between the pilot shuttle port and the drain shuttle port when the engine-driven pump is operational, and a second position closing communication between the inlet shuttle port and the pilot shuttle port and opening communication between the pilot shuttle port and the drain shuttle port when the engine-driven pump is not operating, and a resilient member coupled to the shuttle valve member and biased to urge the shuttle valve member to the second position, the shuttle valve member being movable to the first position in response to pressure in the inlet shuttle port.

2. The invention of claim 1, further comprising:

relief valve means for de-stroking the variable displacement pump when output pressure from the variable displacement pump exceeds a pressurized pressure.

3. The invention of claim 2, wherein the relief valve means comprises:

an inlet relief port communicated with the outlet line of the variable displacement pump, an outlet relief port communicated with pilot chamber and a relief valve member movable to a first position opening communication between the inlet relief port and the outlet relief port when the output pressure from the variable displacement pump exceeds a predetermined pressure, and to a second position closing communication between the inlet relief port and the outlet relief port when the output pressure from the variable displacement pump is less than a predetermined pressure, and a resilient member coupled to the relief valve member and biased to urge the relief valve member to the second position, the relief valve member being movable to the first position in response to pressure in the inlet relief port.

4. In a vehicle having a hydraulic function, an engine-driven pump for supplying pressurized hydraulic fluid to the hydraulic function, an ground-driven source of pressurized hydraulic fluid and control means for controlling operation of the ground-driven source, the improvement wherein:

the ground-driven source comprises a variable displacement pump, the variable displacement pump comprising a variable stroke cylinder comprising a housing having a bore therein, a piston movable in the bore and cooperating with a wall of the bore to divide the bore into a pilot chamber and a pump chamber, the piston being movable to a de-stroked position in response to fluid pressure in the pilot chamber, and resilient means biased to urge the piston to a stroked position, a rotatable member having a cam member engageable with the piston to reciprocate the piston in response to rotation of the rotatable member; and the control means comprises means for de-stroking the variable displacement pump when the engine-driven pump is operational and relief valve means for de-stroking the variable displacement pump when output pressure from the variable displacement pump exceeds a predetermined pressure, the control means comprising, a pilot line for communicating fluid pressure from an outlet of the engine-driven pump to the pilot chamber, an outlet line for communicating fluid from the pump chamber to an outlet of the engine-driven pump, and an inlet line for communicating fluid from an inlet of the engine-driven pump to the pump chamber; and the means for de-stroking comprising a shuttle valve having an inlet shuttle port communicated with the outlet of the engine-driven pump, a drain shuttle port communicated with a fluid reservoir and a pilot shuttle port communicated with the pilot chamber, a shuttle valve member movable to a first position opening communication between the inlet shuttle port and the pilot shuttle port and blocking communication between the pilot shuttle port and the drain shuttle port when the engine-driven pump is operational, and a second position closing communication between the inlet shuttle port and the pilot shuttle port and opening communication between the pilot shuttle port and the drain shuttle port when the engine-driven pump is not operating, and a resilient member coupled to the shuttle valve member and biased to urge the shuttle valve member to the second position, the shuttle valve member being movable to the first position in response to pressure in the inlet shuttle port.

* * * * *

UNITED STATES PATENT AND TRADEMARK OFFICE
CERTIFICATE OF CORRECTION

PATENT NO. : 5,201,174

DATED : April 13, 1993

INVENTOR(S) : Dennis R. Barber, et al.

It is certified that error appears in the above-identified patent and that said Letters Patent is hereby corrected as shown below:

Column 4, line 65, delete "Pressurized" and insert --Predetermined--.

Signed and Sealed this

First Day of February, 1994

Attest:

BRUCE LEHMAN

*Attesting Officer*  *Commissioner of Patents and Trademarks*